(No Model.)
N. A. WOLCOTT.
DOUBLE ACTING PUMP.
No. 278,208. Patented May 22, 1883.
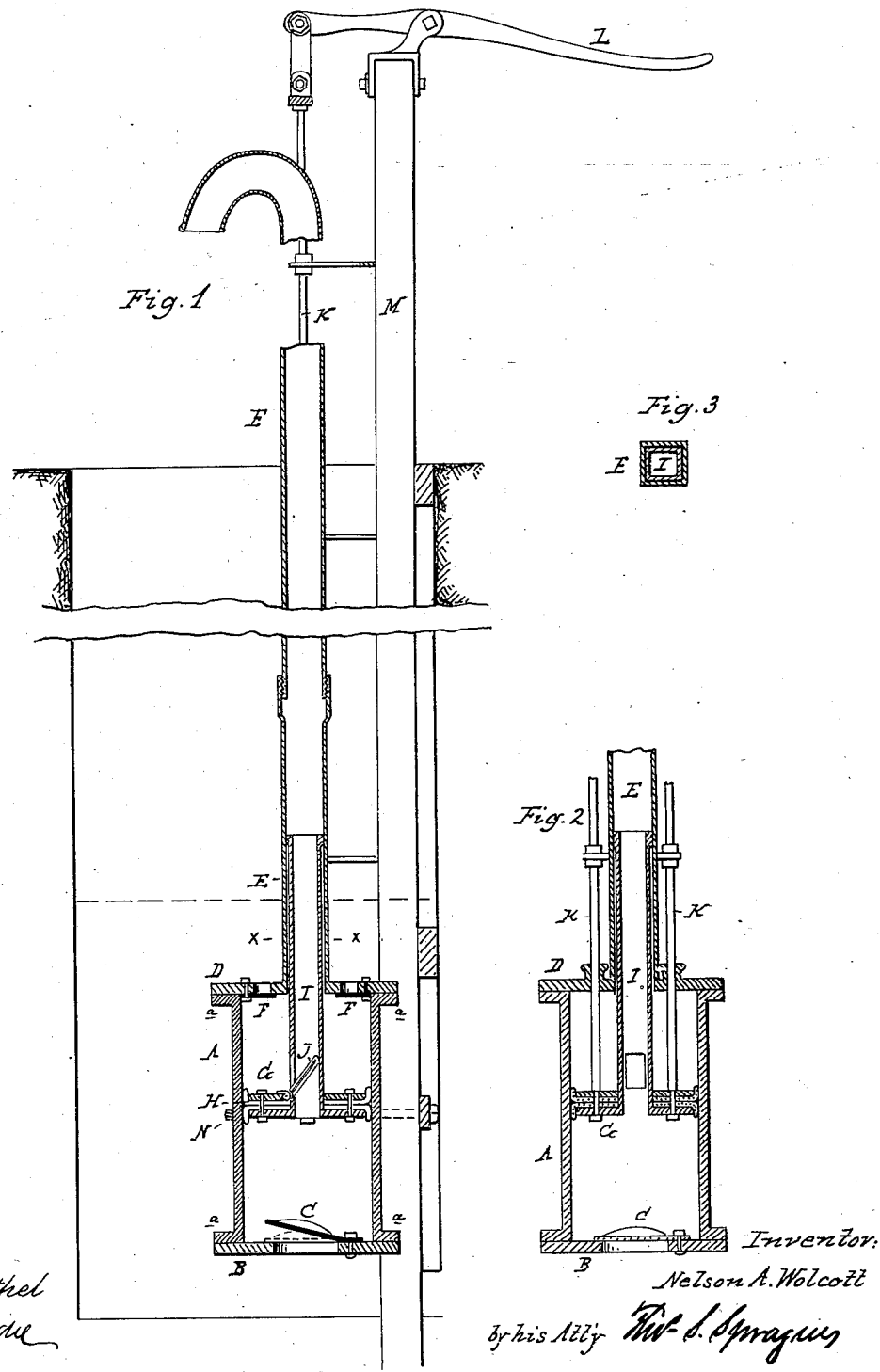

UNITED STATES PATENT OFFICE.

NELSON A. WOLCOTT, OF ELMIRA, NEW YORK.

DOUBLE-ACTING PUMP.

SPECIFICATION forming part of Letters Patent No. 278,208, dated May 22, 1883.

Application filed August 31, 1882. (No model.)

*To all whom it may concern:*

Be it known that I, NELSON A. WOLCOTT, of Elmira, in the county of Chemung and State of New York, have invented new and useful Improvements in Double-Acting Pumps; and I hereby declare that the following is a full, clear, and exact description thereof, reference being had to the accompanying drawings, which form a part of this specification.

The nature of this invention relates to certain new and useful improvements in the construction of double-acting submerged force-pumps; and the invention consists in the peculiar construction, arrangement, and various combinations of the parts, all as more fully hereinafter set forth.

Figure 1 is a central vertical section. Fig. 2 is a vertical central section at right angles to that shown in Fig. 1. Fig. 3 is a cross-section on the line X X in Fig. 1.

In the accompanying drawings, A represents the cylinder of my pump cast in one piece, open at both ends, and provided with the annular flanges $a$. To the lower end of this cylinder I bolt or otherwise properly secure the head B, which is provided centrally with the valve C, which opens inwardly. Upon the upper end of the cylinder I secure the cylinder-head D, from the center of which rises the discharge-pipe E, which affords a passage for the escape of the water from the cylinder. The upper end of this discharge-pipe may terminate in a spout or be threaded to receive a hose or other pipe, as may be desired. Upon opposite sides of this discharge-pipe E and in the cylinder-head I place the valves F, the combined area of which equals the area of the inlet-valve C in the bottom of the cylinder.

G represents the piston-head, which consists of two plates properly bolted together, embracing the leather or other suitable packing, H, which overlaps the edges of the two plates and comes in contact with the interior wall of the cylinder. Rising from the center of this piston G is a pipe, I, which is somewhat longer than the length of the cylinder from head to head, and projects up into the discharge-pipe E, closely fitting therein, but so that it can be easily reciprocated with the piston-head. In the lower portion of this pipe I there is placed a valve, J, which, in the operation of the pump, closes alternately the opening or port through the piston-head, and the port through the side of the pipe I immediately above the piston-head.

K represents pump-rods, which extend upward and above the ground, and are operated or reciprocated by means of the pump-handle L, which latter is fulcrumed upon the top of the standard M.

The pipe I is square in cross-section, as will be seen in Fig. 3. This allows of a single square flap-valve being used, which will lie in an inclined position with its edges against the flat sides of the pipe I, as shown in Fig. 1, and so prevent the water in the pipe returning into the bottom of the cylinder, or will act in a vertical position against the opening in the side of the pipe, and thus prevent the water from returning to the top of the cylinder. By this construction the valve can readily be used inside of a small-sized pipe, which will pass up into the fixed pipe E, whereas in the arrangements of the valves heretofore employed the valve either had to be made in the piston, so as to have a very thick piston, and one that was costly to make, or else there had to be an enlargement of the pipe at the bottom to allow space for the working of the valve. In either case the cylinder was necessarily longer than when my arrangement is used.

By arranging the rods K K outside of the pipe, the space occupied by a rod inside the tubing is saved, and thus the tube I can be made smaller than it could if the connecting-rod passed through it, and there is a clear, unobstructed passage for the water after it has passed the valve.

To retain the pump in its proper position within the well, I secure it to the lower end of the standard M, which projects down into the well for that purpose, by means of a proper clamp N.

In the upward stroke of the piston, water is drawn into the cylinder through the valve C, while at the same time by this movement of parts the valves F and J are closed. In the return-stroke or downward movement of the piston the valve C is closed, which causes the water confined in the lower portion of the cylinder and below the piston to find exit through the valve J into the pipe I, and from thence through the pipe E, thus causing the valve J to close the opening in the side of the pipe I, while it opens the valves F and allows water to flow freely into the cylinder above the piston-head. In the return upward stroke of the piston, the valves F are shut and the valve I is closed over the opening through the piston-head, which compels the water in the cylinder above the piston to find exit through the pipe I into the pipe F, as before described, and a continued reciprocation of the piston will cause a continuous discharge of water at the surface and with considerable force.

It can readily be seen that this pump can be easily adjusted to a well of any depth by the mere lengthening of the discharge-pipe and pump-rod, and that it is prevented from freezing from the fact that the water in the well will at all times be above the cylinder.

In order to prevent rusting and corroding of the parts, I propose to coat the cylinder and the submerged pumps with porcelain or other suitable material which will protect them from the action of the water.

I am aware of the patent to Hopkins, April 12, 1881, and also of the patent to Cosgrove, August 8, 1882, and therefore do not claim any of the inventions therein set forth.

I am also aware that it is not new to use a piston having a valve working in a chamber connecting the piston-rod with the piston, in which chamber works a valve that alternately closes openings in the piston and the side of said chamber, that it is not new to use valves arranged in a chamber above the piston communicating with a hollow piston-rod, that central discharge-tubes working inside the main discharge-tubes have been attached to pistons, and that valves have been arranged to work against an opening in the side of a chamber, and also close an opening when in an inclined position by coming in contact with another valve operating in the same way, and I therefore make no claim to these constructions.

What I claim as my invention is—

1. In a double-acting pump, and in combination with the cylinder A thereof, the valves C and F, the piston-rods K K working outside of the central and main discharge-pipes, and piston G provided with the pipe I and vibrating valve J, substantially as and for the purposes specified.

2. A double-acting pump having a central discharge and a piston provided with a square central discharge-pipe, which latter reciprocates within the main discharge-pipe, and a valve operating against the opposite flat sides of the central discharge-pipe, substantially as set forth.

3. In a double-acting pump having a central discharge, and in combination with the cylinder A, provided with the inlet-valves C and F, the piston G, provided with a square central discharge-pipe, I, and a vibrating valve J constructed and arranged to pass into the main discharge-pipe E, substantially as and for the purpose specified.

NELSON A. WOLCOTT.

Witnesses:
C. M. BACKMAN,
A. M. WESTLAKE.